United States Patent
Taguchi

(10) Patent No.: US 6,349,635 B2
(45) Date of Patent: Feb. 26, 2002

(54) APPARATUS TO ROLL-UP LAMINAR SHEETS OF FOOD MATERIAL IN TUBULAR SHAPE

(75) Inventor: Seiji Taguchi, Oomiya (JP)

(73) Assignee: Nichiraku Kikai Co Ltd., Saitama-ken (JP)

( * ) Notice: Subject to any disclaimer, the term of this patent is extended or adjusted under 35 U.S.C. 154(b) by 0 days.

(21) Appl. No.: 09/756,853

(22) Filed: Jan. 10, 2001

(30) Foreign Application Priority Data

Mar. 24, 2000 (JP) .......................................... 2000-84509

(51) Int. Cl.⁷ .............................. A21C 3/06; B29C 53/32
(52) U.S. Cl. ...................... 99/450.2; 99/353; 99/450.1; 99/450.6; 425/321; 425/322; 425/335; 425/115; 425/371
(58) Field of Search ................................ 99/494, 450.1, 99/450.2, 450.6, 450.7, 450.8; 425/115, 321, 324, 374, 368, 371; 426/500, 501, 512, 502

(56) References Cited

U.S. PATENT DOCUMENTS

| | | | | |
|---|---|---|---|---|
| 3,704,664 A | * | 12/1972 | Fisher, Jr. ................... | 99/450.2 |
| 3,861,291 A | * | 1/1975 | Guzaski ..................... | 99/450.2 |
| 4,043,259 A | * | 8/1977 | Sato ........................... | 99/353 |
| 4,171,197 A | * | 10/1979 | Sato ........................... | 425/321 |
| 4,656,908 A | * | 4/1987 | Elwoood ................. | 99/450.2 X |
| 4,741,263 A | * | 5/1988 | Ueno et al. ............... | 99/353 X |
| 4,905,583 A | * | 3/1990 | Hayashi ..................... | 99/450.2 |
| 4,996,915 A | * | 3/1991 | Morikawa et al. ......... | 99/450.2 |
| 5,018,439 A | * | 5/1991 | Bordin ..................... | 9/450.6 X |
| 5,281,120 A | * | 1/1994 | Morikawa et al. .......... | 425/115 |

* cited by examiner

Primary Examiner—Timothy F. Simone
(74) Attorney, Agent, or Firm—Birch, Stewart, Kolasch & Birch, LLP

(57) ABSTRACT

An apparatus for rolling up laminar sheets of food material in a tubular shape. The apparatus includes an assembly having a plurality of roll-up rollers located at a terminal zone of a conveyor for the laminar sheet of food material. The rolling-up rollers are of the same diameter as well as the same revolutionary speed and are arranged on a concentric circle so that the plurality of rolling-up rollers contact an outer surface of laminar sheet of food material and thereby roll-up the laminar sheet of food material in a tubular shape.

9 Claims, 4 Drawing Sheets

APPARATUS TO ROLL-UP LAMINAR SHEETS OF FOOD MATERIAL IN TUBULAR SHAPE

BACKGROUND OF THE INVENTION

1. Field of the Invention

This invention relates to an apparatus for successively rolling up laminar sheets of food material such as cheese or ham each in a tubular shape.

2. Description of Background Art

No mechanical apparatus has been developed, which is effective in practical use to roll up laminar sheets of food material each in a tubular sheet and such processing has necessarily been carried out by hand labor. Processing by hand labor has sometimes led to unevenness of the individual products and even to an unsanitary product.

In view of such problems, it is a principal object of this invention to provide a novel apparatus developed on the basis of various experimental studies to roll up laminar sheets of food material with a high efficiency not by hand labor but mechanically.

SUMMARY OF THE INVENTION

The object set forth above is achieved, according to this invention, by an apparatus comprising a plurality of rolling-up rollers being same in diameter as well as in revolution speed. These rolling-up rollers are arranged on a concentric circle at a terminal zone of a conveyor for laminar sheets of food material. They come in contact with an outer surface of said laminar sheet of food material and thereby roll up each of these laminar sheets of food material in a tubular shape. The outermost rolling-up roller of said assembly serves also as a driving roller and the remaining rolling-up rollers are adapted to swing upward without interrupting rotation thereof. Such swinging upward occurs around the rolling-up roller adjoining said rolling-up roller serving also as the driving roller so that the remaining rolling-up rollers may be opened outward.

A mechanism to open said remaining rolling-up rollers outward comprises a cylinder and an elevating device adapted to be actuated by said cylinder. Said mechanism causes a pair of bearing plates rotatably supporting all the rolling-up rollers to swing upward, i.e., to be opened outward as said elevating device is actuated by said cylinder. This swinging upward of said bearing plates and therefore of said remaining rolling-up rollers occurs around said rolling-up roller adjoining said rolling-up roller serving also as the driving roller. A driving mechanism to rotate said assembly of rolling-up rollers and said elevating device to open said remaining rolling-up rollers outward are placed on one side of the apparatus with respect to a conveying direction. The respective rolling-up rollers have their circumferential surfaces appropriately roughed to prevent said laminar sheet of food material from slipping on and sticking to said circumferential surfaces.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art form this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
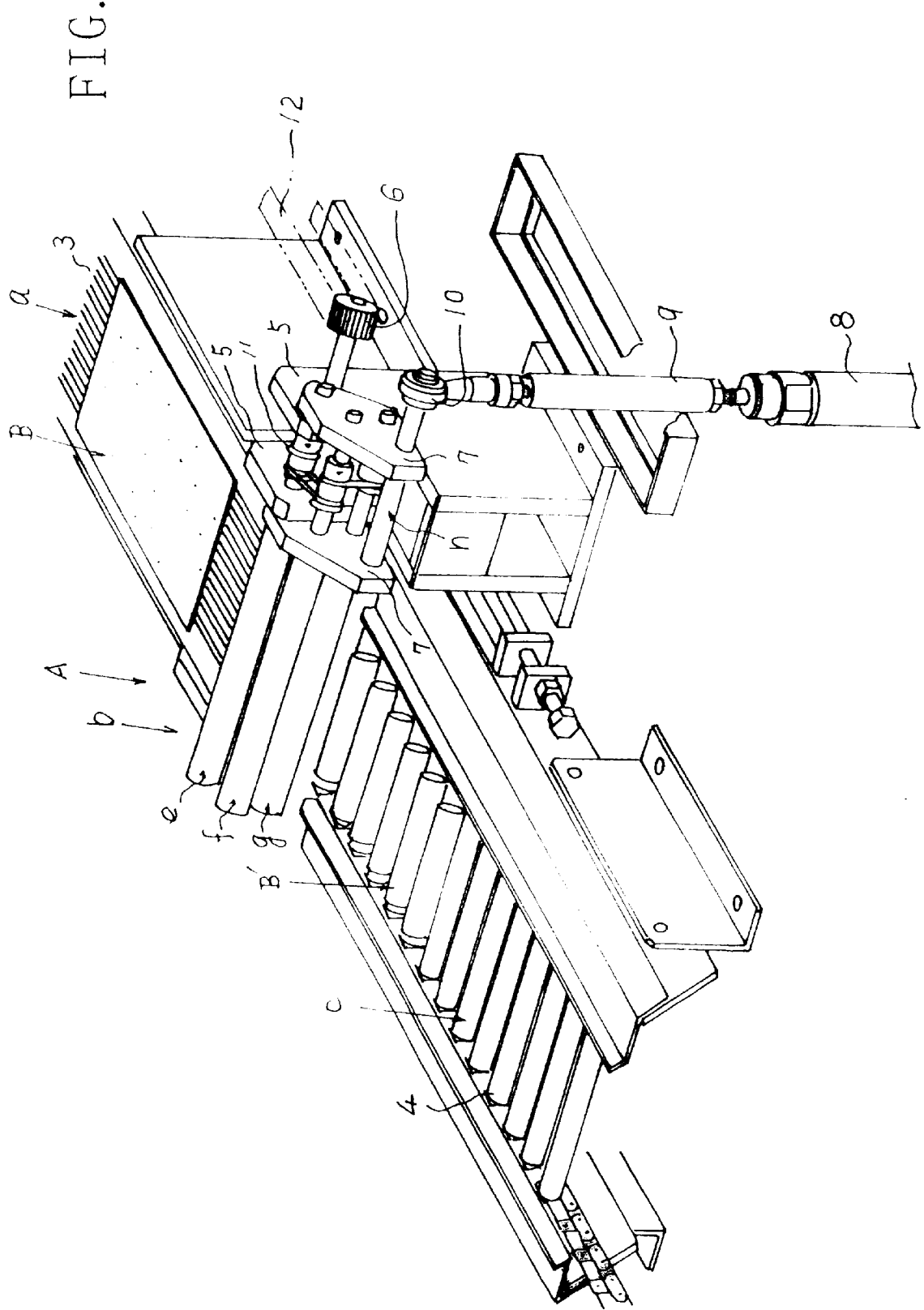
FIG. 1 is a perspective view showing the entire apparatus according to this invention.
Figure 2:
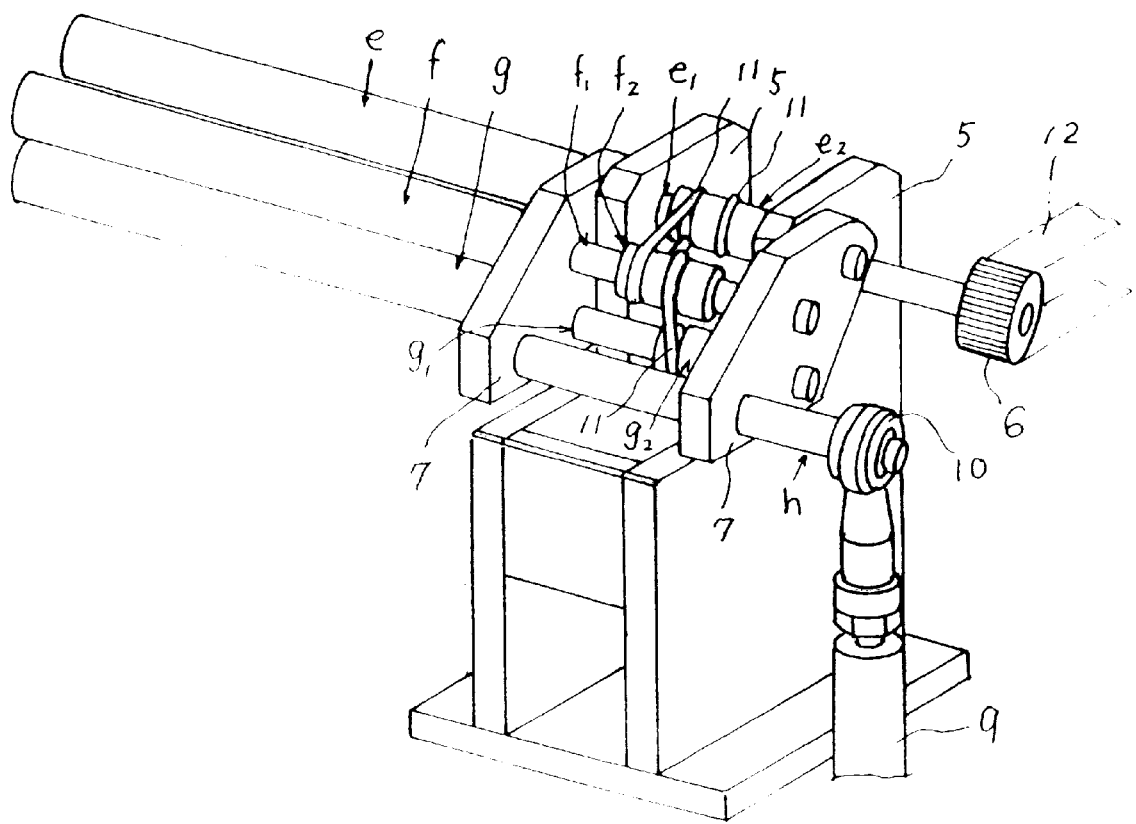
FIG. 2 is a fragmentary scale-enlarged perspective view showing a part of FIG. 1.
Figure 3:
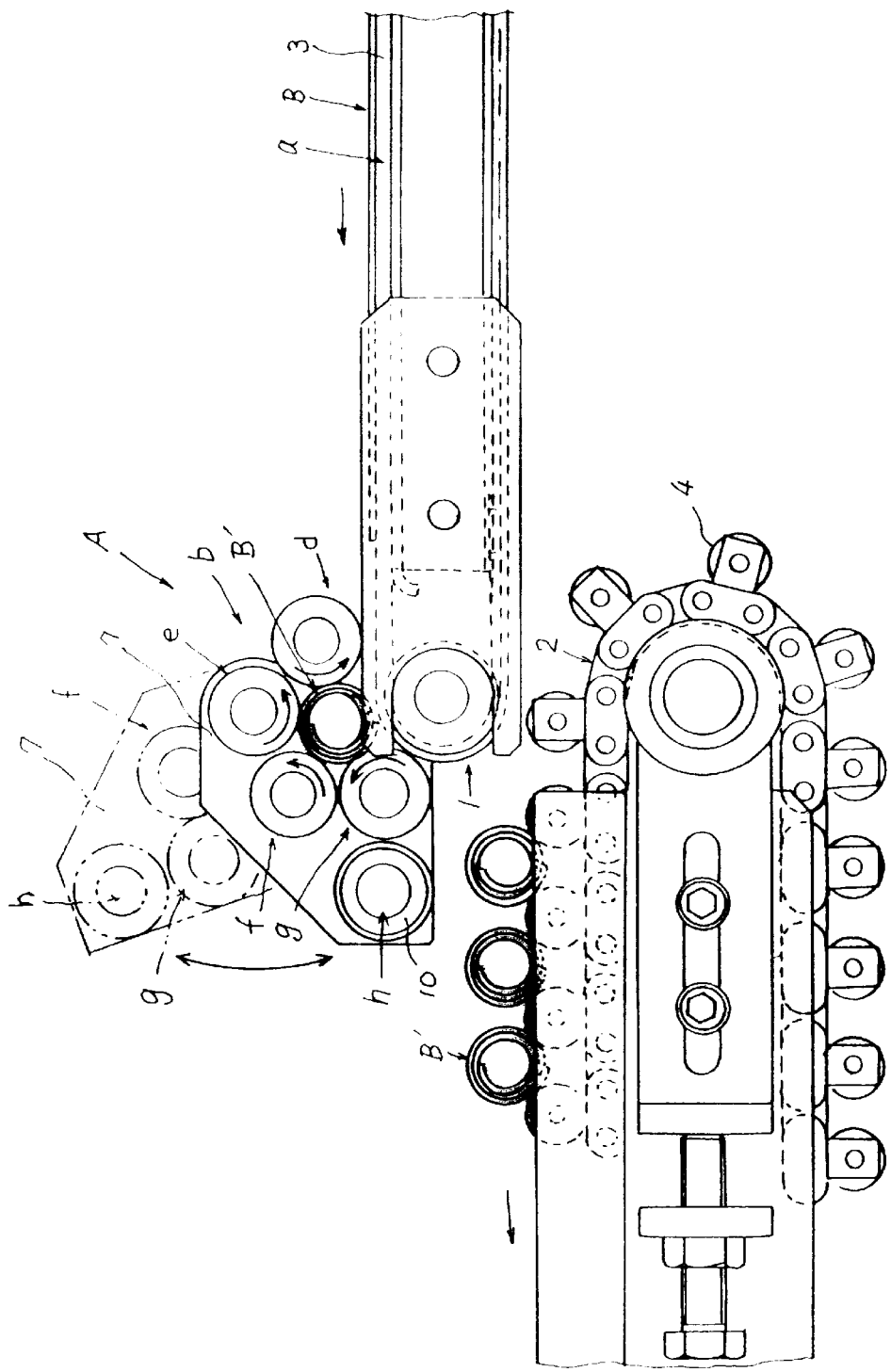
FIG. 3 is a side view of the apparatus showing important parts of a feeding conveyor, a rolling-up roller assembly and a discharging conveyor, respectively.
Figure 4:
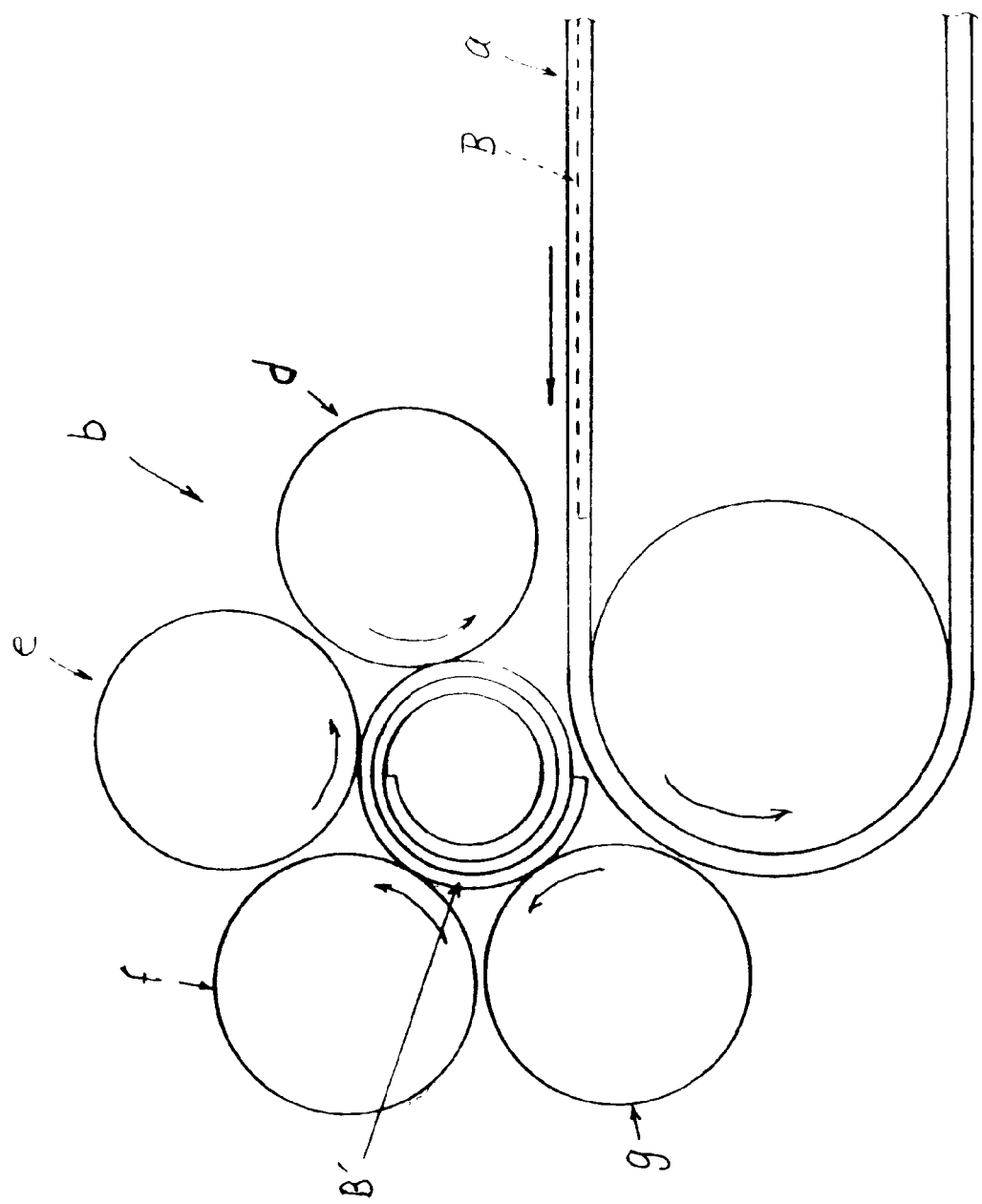
FIG. 4 is a diagram illustrating a manner in which said rolling-up roller assembly operates.

Reference numerals used in the drawings are identified as follows: A: apparatus to roll-up laminar sheets of food material in tubular pieces; B: laminar sheets of food material such as cheese or ham; B': product rolled up into tubular pieces; a: feeding conveyor; b: a rolling-up roller assembly; c: discharging conveyor; d–g: individual rolling-up rollers; d1–g1: extension shafts; d2–g2: pulleys; h: rocking shaft; 1: terminal zone; 2: starting zone; 3: rope belt; 4: roller chain; 5: frame plate; 6: input roller; 7: bearing plate; 8: cylinder; 9: elevating lever; 10: joint ball; 11: stretchable belt; 12: input belt.

DESCRIPTION OF THE PREFERRED EMBODIMENTS

This invention relates to a mechanical apparatus to roll up laminar sheets of food material such as cheese or ham each in a tubular shape. The invention aims to improve an efficiency for rolling up of laminar sheets of food material, which has been manually carried out, by using said mechanical apparatus.

Conventionally, thread- or belt-like long food material has been rolled up into a tubular shape by winding this around a tubular core put on a rotary shaft or the like.

However, the laminar sheet of food material such as cheese or ham is too short to be adapted to be wound around and then removed from said rotary shaft or the like. Particularly in view of the particular form of the object to be rolled up in a tubular shape, the laminar sheet of food material has necessarily been manually rolled up to form a tubular product.

In view of the fact that the object to be rolled up is laminar sheet of food material, the apparatus of this invention has a unique construction. Specifically, the apparatus is located at a terminal zone of a conveyor to roll up said laminar sheets of food material successively fed by said conveyor each in a tubular shape. The apparatus comprises an assembly of plural rolling-up rollers which are same in diameter as well as in revolution speed and arranged on a concentric circle. Each of said laminar sheets of food material is rolled up in 2–3 layers with its outer surface being supported by inner side of said rolling-up roller assembly. Thereupon, said roller assembly is partially opened outward so that the laminar sheet of food material thus rolled up in a tubular shape may drop onto a discharging conveyor and be conveyed away thereby. The laminar sheets of food material rolled up each in the tubular shape drop onto the discharging conveyor without any apprehension of being significantly deformed.

The rolling-up roller assembly preferably comprises four component rolling-up rollers of which the outermost one serves also as a driving roller. The respective rolling-up rollers have their extension shafts carrying thereon pulleys about which a driving belt is draped. In this way, said outermost rolling-up roller drives the remaining rolling-up rollers to rotate respectively in a direction enabling the laminar sheet of food material to be rolled up in the tubular shape.

Having rolled up the laminar sheet of food material in 2 or 3 layers, the rolling-up roller assembly swings upward around the rolling-up roller adjoining said roller serving also as the driving roller. As a result, the remaining two rolling-up rollers are opened outward. During such swinging operation of the roller assembly, the component rolling-up rollers continue to rotate so as to discharge the sheet of food material rolled up each in the tubular shape.

Taking account of the fact that the object to be rolled up is laminar sheet of food material, these rolling-up rollers have their circumferential surfaces appropriately roughed. This is to prevent the laminar sheet of food material from slipping over or sticking to the circumferential surfaces of the rolling-up rollers during the rolling-up operation.

The invention will be described by way of a preferred embodiment in reference with the accompanying drawings.

An apparatus (A) according to this invention is adapted to roll up laminar sheets of food material (B) such as cheese or ham each in a tubular shape. Said laminar sheets of food material (B) may be, for example, sheets of cheese each having a thickness of 0.8–3 mm, a width of 85 mm and a length of 125 mm. Such sheet is to be rolled up by the apparatus (A) in 2–3 layers to form a tubular product (B') having a diameter of 15 mm and a length of 85 mm.

The apparatus (A) to roll up the laminar sheet of food material (B) to form the tubular product (B') is placed above a terminal zone (1) of a feeding conveyor (a) for the laminar sheet of food material (B). The apparatus (A) includes a rolling-up roller assembly (b) adapted to roll up said laminar sheet of food material (B) to form the tubular product (B') and a discharging conveyor (c). The latter extends below said rolling-up roller assembly (b) and has its starting zone (2) immediately below said rolling-up roller assembly (b).

The feeding conveyor (a) comprises a plurality of rope belts (3) extending in parallel one to another in a feeding direction. The discharging conveyor (c) is provided in the form of a roller chain (4) comprising a plurality of rollers each extending transversely of said feeding direction.

The rolling-up roller assembly (b) comprises four rolling-up rollers (d), (e), (f), (g) arranged on a concentric circle.

The rolling-up roller assembly (b) is supported in a cantilever fashion with respect to the feeding direction.

The most upstream rolling-up roller (d) making the part of said rolling-up roller assembly (b) serves also as a driving roller has an extension shaft (d1) rotatably supported by a pair of frame plates (5), (5). The extension shaft (d1) further extends outward to carry thereon an input roller (6).

The rolling-up rollers (e), (f), (g) have their extension shafts (e1), (f1), (g1) rotatably supported by a pair of bearing plates (7), (7) provided outside said frame plates (5), (5), respectively. Of these extension shafts (e1), (f1), (g1), the extension shaft (e1) of the rolling-up roller (e) adjoining the rolling-up roller (d) serving also as the driving roller extends through the frame plates (5), (5) also.

The other rolling-up rollers (f), (g) having their extension shafts (f1), (g1) are adapted to swing upward around the extension shaft (e1) of the rolling-up roller (e).

Swinging upward of said rolling-up rollers (f), (g) is enabled by an arrangement as follows: a joint ball (10) is fixed to the upper end of an elevating lever (9) having its lower end connected to a cylinder (8) adapted to lift said lever (9); and said joint ball (10) is, in turn, rotatably mounted on an outer end of a rocking shaft (h) extending through the bearing plates (7), (7).

With this arrangement, the rolling-up rollers (f), (g) swing up- and downward around the rolling-up roller (e) as the shaft (9) is vertically driven by the cylinder (8).

Transmission of rotational movement from the rolling-up roller (d) serving also as the driving roller to the remaining rolling-up rollers (e), (f), (g) is effected by an elastic belt (11). The elastic belt (11) is draped about pulleys (d2), (e2), (f2), (g2) which are, in turn, mounted on the respective extension shafts (d1), (e1), (f1), (g1). The rolling-up roller (d) serving also as the driving roller is driven by an input belt (12) draped about an input roller (6) fixed on the outer end of the extension shaft (d1).

Now the manner in which the laminar sheet of food material (B) is rolled up to form the tubular product.

The laminar sheets of food material (B) are transported by the feeding conveyor (a) at regular intervals.

Every time the laminar sheet of food material (B) reaches the roller assembly (b), the input belt (12) drives the input roller (6). The input roller (6) drives, in turn, the extension shaft (d1) and therefore the rolling-up roller (d) serving also as the driving roller (d). Thus, the pulleys (d2), (e2), (f2), (g2) mounted on the extension shafts (d1), (e1), (f1), (g1), respectively, and the belt (11) successively draped about them are driven. As a result, the rolling-up rollers (e), (f), (g) are rotated in a same direction, i.e., in the direction enabling the laminar sheet of food material (B) to be effectively rolled up to form the tubular product.

The laminar sheet of food material (B) is rolled up along the inner surface of the rolling-up assembly (b) until rolled up in 2–3 layers as the component rollers rotate. Thereupon, the rolling-up roller assembly swings upward so that the rolling-up rollers (f), (g) may be opened outward. During this swinging upward, the rolling-up roller assembly (B) continues to rotate.

Swinging upward of the rolling-up roller assembly (b) occurs with the respective rolling-up rollers continuing to rotate in a manner as follows: the cylinder (8) is actuated to lift the elevating lever (9) and the joint ball (10) fixed to the upper end of said lever (9); consequently, said joint ball (10) causes the rocking shaft (h) and therefore the bearing plates (7), (7) to swing upward around the extension shaft (e1) of the rolling-up roller (e). Obviously, the frame plates (5), (5) also swing upward together with said bearing plates (7), (7) to open the rolling-up roller assembly outward.

Swinging upward of said bearing plates (7), (7) causes the rolling-up rollers (f), (g) have their extension shafts (f1), (g1) rotatably supported by said bearing plates (7), (7) to be opened outward. In this way, these rolling-up rollers (f), (g) become apart from the tubular product (B') obtained from the laminar sheet of food material (B).

Now the individual tubular product (B') is received by the discharging conveyor (c) in the form of the roller chain (4) underlying the assembly (b). The tubular product (B') is placed on the conveyor (c) between each pair of the adjacent rollers each extending transversely of the roller chain (4) to be conveyed away.

As soon as the tubular product (B') has been discharged onto the discharging conveyor (c), the next laminar sheet of food material is fed into the rolling-up roller assembly (b) to be rolled up to form the tubular product (B').

This is achieved by appropriately adjusting a distance between each pair of the succeeding laminar sheets of food material (B) on the feeding conveyor (a). Specifically, said distance may be adjusted to be substantially equal to a distance by which the feeding conveyor (a) travels before the precedent laminar sheet (B) has completely been processed.

The input roller (6) is driven by the input belt (12) to rotate the respective rollers of the rolling roller assembly (b). Thus the latter rolls up the laminar sheet of food material (B) in 2–3 layers to form the tubular product (B').

In brief, the laminar sheets of food material (B) are fed at a predetermined speed into the rolling-up roller assembly (b) to be successively rolled up to form the tubular products (B'). As has already been described, each laminar sheet (B) is rolled up by said rolling-up roller assembly (b) driven by the input belt (11). In response to formation of each tubular product (B'), the cylinder (8) moves the lever (9) upward so that the rolling-up roller assembly (b) may swing upward. As a result, the rolling-up rollers (f), (g) are opened outward and the product (B') drop onto the discharging conveyor (c) to be conveyed away.

As previously mentioned, the apparatus according to this invention is to roll up the laminar sheets of food material such as cheese or ham to form the tubular products. Such laminar sheets of food material are relatively short in size and have conventionally been rolled up to form the tubular products through manual operation. This invention provides the apparatus adapted to mechanically and efficiently roll up such laminar sheets to form the tubular products without relying upon any core.

The apparatus according to this invention substantially comprises an assembly including a plurality of same diameter rolling-up rollers arranged on a concentric circle. These rolling-up rollers are adapted to rotate with a same speed in a direction enabling each laminar sheet of food material to be rolled up to form a tubular product. Every time the laminar sheet has been rolled up in 2–3 layers, the rolling-up roller assembly is partially opened outward with the respective rollers continuing to rotate to discharge the tubular product. In this way, it is possible to obtain the products having a uniform shape with an extremely high efficiency.

Both the drive mechanism for the rolling-up roller assembly and the elevating mechanism adapted for partially opening said assembly are placed on one side of the apparatus with respect to the feeding direction. Such placement is effective to simplify not only the apparatus as a whole but also the operation thereof.

Thereby a possibility of the apparatus trouble is reduced and the apparatus maintenance is facilitated. The rolling-up roller assembly supported in the cantilever fashion can bear the load since the object to be rolled up in the tubular shape is the laminar sheet of food material.

The component rollers of the rolling-up roller assembly have their circumferential surfaces appropriately roughed to prevent the laminar sheet of food material from slipping on or sticking to said circumferential surfaces. In this way, there is no apprehension that said laminar sheet might slip on the roller at a moment of entering into the rolling-up roller assembly. The roughness of said circumferential surfaces can avoid also an apprehension that said laminar sheet might stick to the roller and consequently be introduced between a pair of the adjacent rollers. Thus the laminar sheet of food material can be smoothly rolled up in the tubular shape.

The invention being thus described, it will be obvious that the same may be varied in many ways. Such variations are not to be regarded as a departure from the spirit and scope for the invention, and all such modifications as would be obvious to one skilled in the art are intended to be included within the scope of the following claims.

What is claimed is:

1. Apparatus for rolling up a laminar sheet of food material in a tubular shape, said apparatus comprising an assembly of plural rolling-up rollers located at a terminal zone of a conveyor for said laminar sheet of food material,
   said rolling-up rollers being same in diameter as well as in revolution speed and arranged on a concentric circle so that said plural rolling-up rollers may contact an outer surface of said laminar sheet of food material and thereby roll up this laminar sheet of food material in a tubular shape.

2. Apparatus according to claim 1, wherein the outermost rolling roller of said assembly serves also as a driving roller and said assembly is adapted to swing upward without interrupting rotation of the respective rollers around the rolling-up roller adjoining said rolling-up roller serving also as the driving roller so that the remaining rolling-up rollers may be opened outward.

3. Apparatus according to claim 2, wherein a mechanism to open said rolling-up rollers outward comprises a cylinder and an elevating device adapted to be actuated by said cylinder so that said rolling-up rollers may be opened outward around said rolling-up roller adjoining said rolling-up roller serving also as the driving roller.

4. Apparatus according to claim 2, wherein a driving mechanism to rotate said assembly of rolling-up rollers and said elevating device to open said rolling-up rollers outward are placed on one side of the apparatus with respect to a direction in which said laminar sheet of food material is conveyed.

5. Apparatus according claim 1, wherein the respective rolling-up rollers of said assembly have their circumferential surfaces appropriately roughed to prevent said laminar sheet of food material from slipping on and sticking to said circumferential surfaces of the respective rolling-up rollers.

6. Apparatus according to claim 3, wherein a driving mechanism to rotate said assembly of rolling-up rollers and said elevating device to open said rolling-up rollers outward are placed on one side of the apparatus with respect to a direction in which said laminar sheet of food material is conveyed.

7. Apparatus according to claim 2, wherein the respective rolling-up rollers of said assembly have their circumferential surfaces appropriately roughed to prevent said laminar sheet of food material from slipping on and sticking to said circumferential surfaces of the respective rolling-up rollers.

8. Apparatus according to claim 3, wherein the respective rolling-up rollers of said assembly have their circumferential surfaces appropriately roughed to prevent said laminar sheet of food material from slipping on and sticking to said circumferential surfaces of the respective rolling-up rollers.

9. Apparatus according to claim 4, wherein the respective rolling-up rollers of said assembly have their circumferential surfaces appropriately roughed to prevent said laminar sheet of food material from slipping on and sticking to said circumferential surfaces of the respective rolling-up rollers.

* * * * *